US009218065B2

(12) United States Patent
Mahameed et al.

(10) Patent No.: US 9,218,065 B2
(45) Date of Patent: Dec. 22, 2015

(54) STRESS TOLERANT MEMS ACCELEROMETER

(71) Applicant: Intel Corporation, Santa Clara, CA (US)

(72) Inventors: Rashed Mahameed, Beaverton, OR (US); Mohamed A. Abdelmoneum, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 252 days.

(21) Appl. No.: 13/794,441

(22) Filed: Mar. 11, 2013

(65) Prior Publication Data

US 2015/0022431 A1 Jan. 22, 2015

(51) Int. Cl.
*G01P 15/125* (2006.01)
*G06F 3/01* (2006.01)
*H02N 1/00* (2006.01)

(52) U.S. Cl.
CPC .............. *G06F 3/017* (2013.01); *G01P 15/125* (2013.01); *H02N 1/008* (2013.01)

(58) Field of Classification Search
CPC ... G01P 15/125; G01P 15/0802; G01P 15/18; G01P 15/131
USPC ......................................... 73/514.32, 514.38
See application file for complete search history.

(56) References Cited

U.S. PATENT DOCUMENTS

| | | | |
|---|---|---|---|
| 6,960,488 B2 * | 11/2005 | Brosnihan et al. ............... | 438/52 |
| 7,119,636 B2 | 10/2006 | Nguyen et al. | |
| 7,152,474 B2 * | 12/2006 | Deb et al. .................... | 73/514.32 |
| 7,279,761 B2 * | 10/2007 | Acar et al. ..................... | 257/415 |
| 7,418,864 B2 * | 9/2008 | Asami et al. ............... | 73/514.32 |
| 8,307,709 B2 * | 11/2012 | Ullrich ........................ | 73/514.32 |
| 8,827,550 B2 | 9/2014 | Abdelmoneum et al. | |
| 2008/0087085 A1 * | 4/2008 | Ueda et al. .................. | 73/514.32 |
| 2009/0064784 A1 * | 3/2009 | Wang ........................ | 73/514.32 |
| 2009/0282914 A1 * | 11/2009 | Rehle ......................... | 73/504.12 |
| 2009/0320596 A1 * | 12/2009 | Classen et al. ............. | 73/514.32 |
| 2010/0288047 A1 * | 11/2010 | Takagi ....................... | 73/514.32 |
| 2013/0192371 A1 * | 8/2013 | Rytkonen et al. .......... | 73/514.32 |
| 2013/0220016 A1 * | 8/2013 | Simoni et al. ............... | 73/514.32 |
| 2013/0283913 A1 * | 10/2013 | Lin et al. ..................... | 73/514.32 |

OTHER PUBLICATIONS

Huang, et al., "Fully Monolithic CMOS Nickel Micromechanical Resonator Oscillator", IEEE, MEMS 2008, pp. 10-13.

(Continued)

*Primary Examiner* — Helen Kwok
(74) *Attorney, Agent, or Firm* — Blakely, Sokoloff, Taylor & Zafman LLP

(57) ABSTRACT

A Micro-Electro-Mechanical System (MEMS) accelerometer employing a rotor and stator that are both released from a substrate. In embodiments, the rotor and stator are each of continuous a metal thin film. A stress gradient in the film is manifested in capacitive members of the rotor and stator as a substantially equal deflection such that a relative displacement between the rotor and stator associated with an acceleration in the z-axis is substantially independent of the stress gradient. In embodiments, the stator comprises comb fingers cantilevered from a first anchor point while the rotor comprises comb fingers coupled to a proof mass by torsion springs affixed to the substrate at second anchor points proximate to the first anchor point.

21 Claims, 9 Drawing Sheets

(56) References Cited

OTHER PUBLICATIONS

Huang, et al., "Nickel Vibrating Micromechanical Disk Resonator with Solid Dielectric Capacitive-Transducer Gap", 2006 IEEE FCS, pp. 839-847.

Jha, et al., "CMOS-Compatible Dual-Resonator Temperature Sensor With Milli-Degree Accuracy, 2007 IEEE Sensors & Actuator", IEEE 2007, pp. 229-232.

Koskenvouri, et al., "Temperature Measurement and Compensation Based on Two Vibrating Modes of a Bulk Acoustic Mode Microresonator", IEEE MEMS 2008, pp. 78-81.

Teva, et al., From VHF to UHF CMOS-MEMS Monolithically Integrated Resonators:, IEEE MEMS 2008, pp. 82-85.

Luo, et al., "A Post-CMOS Micromachined Lateral Accelerometer", Journal of Microelectromechanical Systems, vol. 11, No. 3, Jun. 2002, pp. 188-195.

Xie, et al., "A CMOS-MEMS Lateral-Axis Gyroscope", Published in the 14th IEEE International Conference on Micro Electro Mechanical Systems (MEMS 2001), Jan. 21-25, 2001, pp. 162-165.

Selvakumar, et al., "A High-Sensitivity Z-Axis Capacitive Silicon Microaccelerometer With a Torsional Suspension", Journal of Microelectromechanical Systems, vol. 7, No. 2, Jun. 1998, pp. 192-200.

Fedder, Gary K., "Structured Design of Integrated MEMS", in Technical Digest of the 12th IEEE International Conference on Micro Electro Mechanical Systems (MEMSS'99), Jan. 17-21, 1999, pp. 1-8.

Xie, et al., "Simulation and Characterization of a CMOS Z-Axis Microactuator With Electrostatic Comb Drivers", 2000 International Conference on Modeling and Simulation of Microsystems—MSM 2000, Mar. 27-29, 2000, pp. 181-184.

Sun, et al., A Low-Power Low-Noise Dual-Chopper Amplifier for Capacitive CMOS-MEMS Accelerometers:, IEEE Sensors Journal, vol. 11, No. 4, Apr. 2011, pp. 925-933.

Abdelmoneum, et al., Stemless Wine-Glass-Mode Disk Micromechanical Resonators:, Proceedings, 16th Int. IEEE Micro Electro Mechanical Systems Conf., Jan. 19-23, pp. 698-701.

\* cited by examiner

STRESS TOLERANT MEMS ACCELEROMETER

TECHNICAL FIELD

Embodiments of the invention generally relate to Micro-Electro-Mechanical Systems (MEMS), and more particularly relate to MEMS accelerometers having tolerance to intrinsic structural thin film stress.

BACKGROUND

MEMS technology is employed in many sensors, such as accelerometers, and gyroscopes. Many such devices employ a partially released proof mass which undergoes a physical displacement relative to a substrate in response to an external stimulus. Detection of this physical displacement may be detrimentally impacted by residual stresses in the MEMS structure, particularly stress gradients across a thin film thickness, which cause a structure to deflect upon its release from the substrate. Any such deflection has the potential of introducing static errors in the sensor readout in absent of any external stimuli, and may limit the sensitivity and/or accuracy of the sensor.

To date, commercial MEMS sensor implementations rely on a "two-chip" approach where the MEMS structure is contained on a first chip while a control circuit is provided on another (e.g., an ASIC). For this approach, the MEMS structure is typically fabricated in bulk silicon substrate layers (e.g., an SOI layer), or surface micromachined into a polycrystalline semiconductor layer (e.g., silicon or SiGe). In general, for either of these techniques, the structural semiconductor material has very good mechanical properties with low intrinsic stress that might otherwise detrimentally impact sensor performance and/or complicate manufacturing in a manner that increases cost or decreases yield.

The two-chip approach suffers from higher costs and larger form factors than would a single chip solution. However, single-chip approaches have been hindered by the need to have the MEMS structures formed from low-stress films. MEMS structures having designs that are more tolerant of intrinsic film stress would permit a broader choice in the films employed for the MEMS structure and therefore enable further integration of MEMS with conventional integrated circuit technology, such as CMOS, facilitating a single-chip solution.

BRIEF DESCRIPTION OF THE DRAWINGS

Embodiments of the present invention are illustrated by way of example, and not limitation, in the figures of the accompanying drawings in which.

DETAILED DESCRIPTION

Figure 1A:
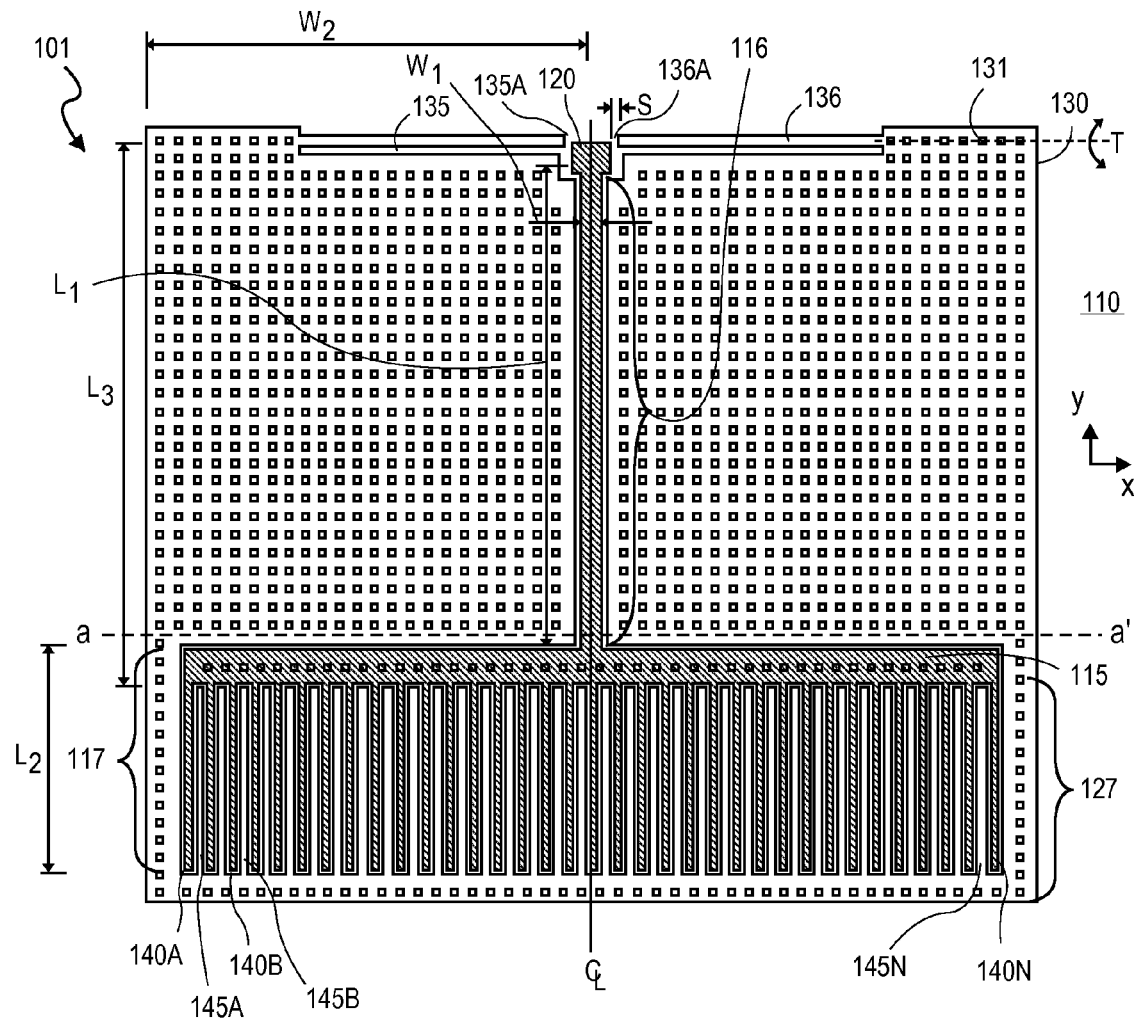
FIG. 1A is a plan view of a stress tolerant MEMS structure, in accordance with an embodiment of the present invention.

In the following description, numerous details are set forth. It will be apparent, however, to one skilled in the art, that the present invention may be practiced without these specific details. In some instances, well-known methods and devices are shown in block diagram form, rather than in detail, to avoid obscuring the present invention. Reference throughout this specification to "an embodiment" or "in one embodiment" means that a particular feature, structure, function, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the two embodiments are not mutually exclusive.

The terms "coupled" and "connected," along with their derivatives, may be used herein to describe structural relationships between components. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g., as in a cause an effect relationship).

The terms "over," "under," "between," and "on" as used herein refer to a relative position of one component or material layer with respect to other components or layers where such physical relationships are noteworthy for mechanical components in the context of an assembly, or in the context of material layers of a micromachined stack, etc. One layer (component) disposed over or under another layer (component) may be directly in contact with the other layer (component) or may have one or more intervening layers (components). Moreover, one layer (component) disposed between two layers (components) may be directly in contact with the two layers (components) or may have one or more intervening layers (components). In contrast, a first layer (component) "on" a second layer (component) is in direct contact with that second layer (component).

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Generally, embodiments of MEMS structures described herein are suitable for sensing acceleration (i.e., accelerometers) and more particularly a z-axis acceleration, where z-axis is out of the plane of the substrate over which the MEMS structure is formed. In embodiments, z-axis acceleration is sensed based on a measurable change in capacitance between two conductive members that are electrically insulated/isolated from each other. For the particular embodiments described in detail herein, the change in capacitance is achieved through a change in capacitive plate area as a rotor rotates relative to a stator in response to acceleration (in the z-dimension), rather than through a change in a distance between the capacitive members. The structures and techniques for imparting tolerance to intrinsic film stress described herein may nonetheless also be adapted to other MEMS structures, such as x-axis and y-axis accelerometers, gyroscopes, and the like, any of which may rely on either a change of capacitive plate area or capacitive plate spacing.

Notably, MEMS accelerometer embodiments described herein advantageously have both of the capacitively coupled structural members (partially) released. In the exemplary embodiments where the structural members include a rotor and a stator, both the rotor and the stator are released structures. The rotor then differs from the stator primarily in its greater mass and anchoring to the substrate, both of which are to promote a large displacement (rotation) of the rotor relative to the stator in response to acceleration. Generally, the stator is to be anchored in a manner that restricts acceleration induced displacement or dynamic deflection, while still allowing the stator to undergo static deflection similar to that which the rotor experiences upon release from the confines of the substrate during fabrication. As such, intrinsic stresses in the structural film(s), and more particularly stress gradients in the structural film(s) affect both the rotor and stator in substantially the same manner. One technical advantage possessed by all embodiments described herein is that both the static capacitance between the rotor and stator and the change in capacitance in response to acceleration are much more well controlled relative to conventional MEMS where only one capacitively coupled element is released, or where a pair of released elements do not have comparably well-match static deflection.

FIG. 1A is a plan view of a stress tolerant MEMS structure 101 disposed over a surface of a substrate 110, in accordance with an embodiment of the present invention. As shown, the released stator includes a beam 116 cantilevered from a stator anchor point 120 affixed to the substrate 110. A plurality of stator comb fingers 117 is disposed at an end of the beam 116 opposite the stator anchor point 120. The released rotor includes a body 130 adjacent to opposite sides of the beam 116 and attached to the substrate 110 at (only) the rotor anchor points 135A, 136A, which are proximate to, but electrically isolated from the stator anchor point 120. A plurality of rotor comb fingers 127 is disposed at an end of the rotor body 130 opposite the rotor anchor points 135A, 135B. Small release holes 131 are used (small squares) to improve uniformity on the device releasing process.

Figure 1B:
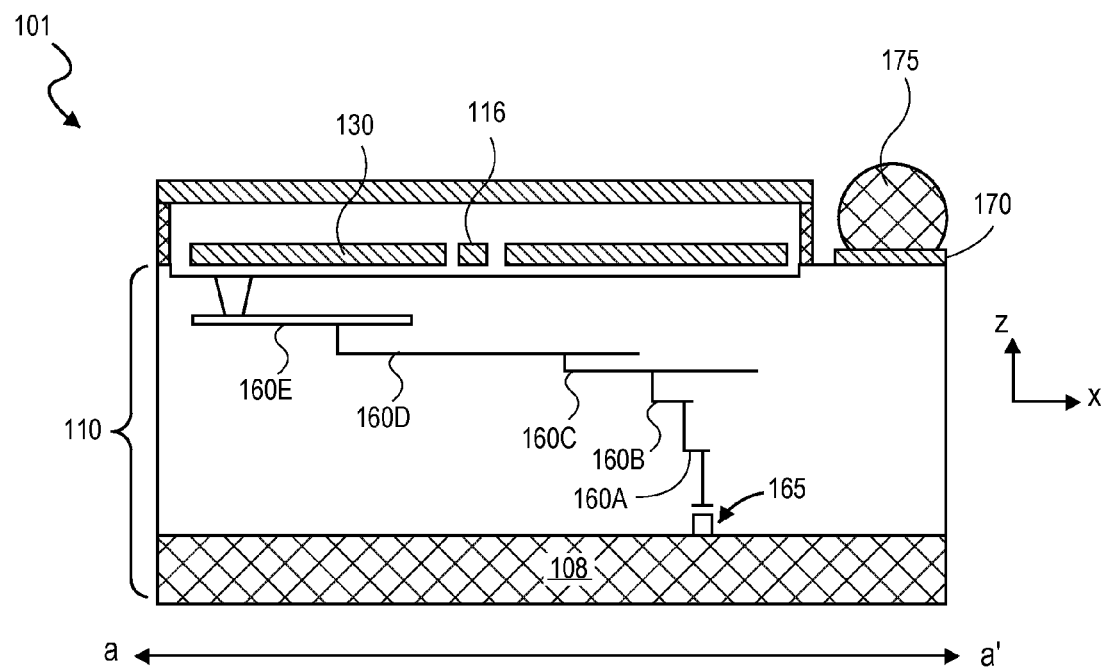
FIG. 1B is a cross-section view of the stress tolerant MEMS structure depicted in FIG. 1A disposed over a substrate comprising integrated circuitry, in accordance with an embodiment.

As shown in FIG. 1A, and further in FIG. 1B, the rotor and stator structural members are of a same thin film layer, or stack of layers. The thin film layer(s) is surface micromachined with any techniques common to MEMS and/or microelectronics to have the rotor comb fingers (e.g., 145A, 145B, and 145N) interdigitated with the stator comb fingers (e.g., 140A, 140B, and 145N). The interdigitated fingers provide high coupling capacitance between the rotor and stator. Because the rotor and stator are of the same thin film layer(s), matching of static deflection in the rotor and stator resulting from any stress gradient in the structural thin film is accomplished, at least in part, by disposing the stator anchor point 120 in close proximity to the rotor anchor points 135A, 136A. As shown in FIG. 1A, the stator anchor point 120 and rotor anchor points 135A, 136A are all in substantially the same x-y plane (i.e., same z-axis height relative to the substrate). In further embodiments, the stator anchor point 120 is spaced apart from the rotor anchor points 135A, 136A over the area of the substrate 110 by a longest distance S that is no more than 5% of the cantilevered length of the stator, and more advantageously no more than 1% of the cantilevered length of the stator. For example, where the cantilevered stator length equal to $L_1+L_2$ is between 200-250 µm, the largest spacing S between the rotor and stator anchor points is less than 5 µm and advantageously less than 2.5 µm.

In embodiments, the longest distance S is in a dimension other than that of the cantilevered length of the stator. For example, where the cantilevered stator length $L_1+L_2$ is in the y-dimension as shown in FIG. 1A, the largest spacing S is in the x-dimension with the stator anchor point 120 overlapping the rotor anchor points 135, 136 in the y-dimension. In this exemplary design, the cantilevered stator length $L_1+L_2$ is nearly equal to a longest length of the rotor ($L_3+L_4$), over which the greatest static deflection will occur. Because the magnitude of deflection is a square function of these structural lengths, having the effective lengths between the anchors and free edges of the comb fingers nearly equal in this dimension improves static deflection matching between the rotor and stator.

In embodiments, the stator anchor point 120 is disposed between the rotor anchor points 135A, 136A with the stator beam 116 extending through a center of the rotor body 130. The rotor and stator are symmetrical about the centerline with the rotor body 130 having a width $W_2$ on either side of the centerline. This configuration reduces the magnitude of static deflection in this dimension (e.g., x-dimension) relative to the dimension of longest length for both the rotor and stator and also facilitates matching of the static deflection between the rotor and stator because the rotor and stator fingers are approximately the same distance away from their respective anchor points in both the x and y dimensions. With rotor anchor points 135A, 136A on opposite sides of the beam 116, and in close proximity to the stator anchor point 120, the torsion springs 135 and 136 each have their longitudinal axis T extending orthogonally away from the beam 116 with the rotor anchor points 135A and 136A more proximate to the beam 116 than all other portions of the torsion springs 135, 136.

The rotor is suspended from the substrate 110 by torsion springs 135 and 136 having freedom in the torsional mode, allowing acceleration in the z-axis normal to the substrate 110 to induce a large torsion about the axis T that displaces the plurality of rotor fingers 127 along the z-axis relative to the stator fingers 117. In embodiments, each torsion spring 135, 136 has a spring length many times a spring width, with exact dimensions tunable for a desired spring coefficient. While the rotor body 130 is large in both the x-dimension and y-dimension for larger mass (e.g., $W_2$~125-175 µm and $L_3+L_4$~200-250 µm), the stator is small in the dimension orthogonal to the cantilevered length of the stator (e.g., small in the x-dimension in FIG. 1A). In embodiments, the beam 116 has a width $W_1$ that is no more than 2% of the cantilevered length $L_1+L_2$, and no more than 10% of the beam length $L_1$, and more advantageously no more than 1% of the beam length $L_1$. In one exemplary embodiment where $L_1+L_2$ is 200-250 μm, $W_1$ is 2.5-5 μm. A small beam width $W_1$ increases the mass differential between the rotor and stator (e.g., rotor being at least five times more massive than the stator), while still accommodating a long lever length between the rotor fingers 127 and the torsion springs 135, 136. In exemplary embodiments, the beam width $W_1$ is no more than 10% of the body width (~$2W_2$), more advantageously no more than 2% of the body width.

In embodiments, the rotor surrounds at least the released end of the stator. As shown in FIG. 1A, the rotor body 130 forms a continuous boarder around two sides of the stator beam 116 and all sides of the stator comb fingers 117. In further embodiments, the rotor may completely surround the stator, including the stator anchor point 120 (e.g., as in FIG. 4). In the embodiment depicted in FIG. 1A, the rotor comb fingers 127 extend off the rotor body 130, in a direction toward the anchor points 120, 135A, and 136A. In other words, the free ends of the fingers 145A, 145B, etc. are more proximate the rotor anchor points 135A, 136A than is the comb shaft 132. This arrangement has the advantage of placing the majority of the rotor comb mass farther from the torsion springs 135, 136 while the majority of the stator comb mass is closer to the stator anchor point 120 since the stator comb fingers extend off the beam 116 away from the anchor points substantially parallel to the rotor fingers.

FIG. 1B is a cross-section view of the stress tolerant MEMS structure 101 disposed over the substrate 110 having integrated circuitry employing one or more transistor 165, in accordance with an embodiment. As shown in FIG. 1B, the substrate 110 is a microelectronic "chip" having interconnect metallization layers (e.g., copper traces) 160A, 160B, 160C, 160D, 160E, etc., up through a top metallization layer. Generally, the interconnect metallization layers increase in thickness with each successive layer, such that in advantageous embodiments the top metallization layer is of sufficient thickness to form the members of the MEMS structure 101 (e.g., 10 μm, or more). As shown in FIG. 1B, the rotor body 130 and stator beam 116 are both formed of the same top level of interconnect metallization (e.g., copper) present in a pad, plug, post, 170 employed to couple the chip to a package substrate, interposer, board, etc., for example by way of solder 175.

Chip-level integration becomes possible with geometries of the MEMS structure 101 neutralizing the effects of static deflection resulting from the intrinsic stress gradients along the z-axis in the thick interconnect metallization layer. In exemplary embodiments, the electrically continuous stator is electrically coupled to CMOS circuitry in the substrate 110. Similarly, the electrically continuous rotor is further electrically coupled to the CMOS circuitry. As such, the CMOS circuitry may further implement electrical functions of an integrated accelerometer. For example, in one embodiment, the CMOS circuitry in the substrate 110 includes at least one of an amplifier or acceleration calculator (i.e., the amplifier or acceleration calculator circuitry employs the transistor 165). The amplifier, for example, is to output a signal based on a change in capacitance registered between the rotor and stator in response to torsion in the torsion springs displacing the rotor relative to the stator. The acceleration calculator is then to further determine and output a z-axis acceleration based on the signal output from the amplifier. Of course, the CMOS circuitry may implement any number of functions known in the art in addition, or in the alternative, to these exemplary embodiments.

Figure 2A:
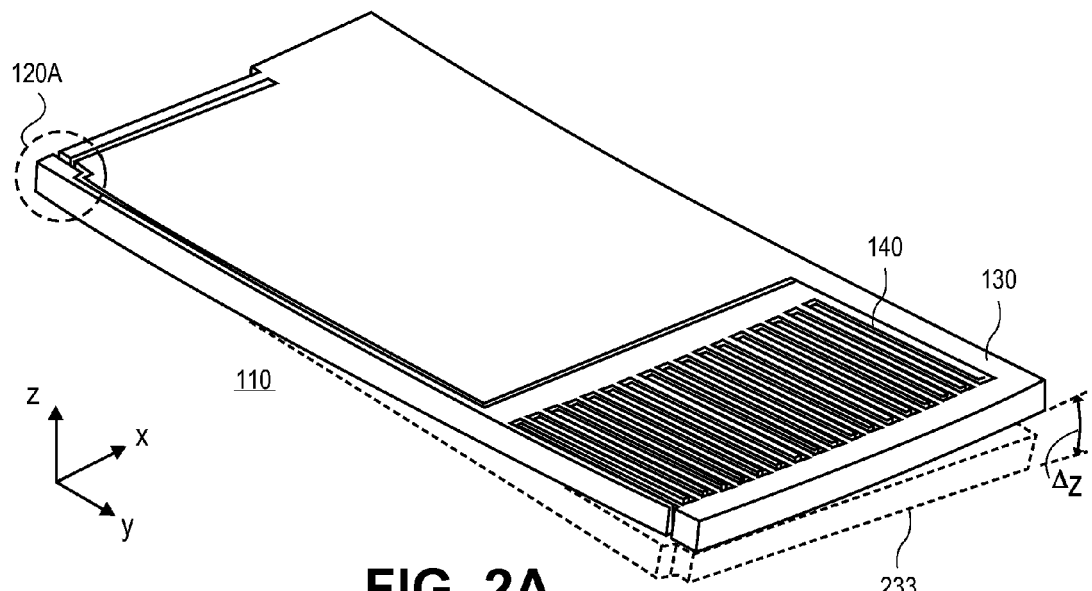
FIG. 2A is an isometric view of a portion of the MEMS structure depicted in FIG. 1A, in accordance with an embodiment.
Figure 2B:
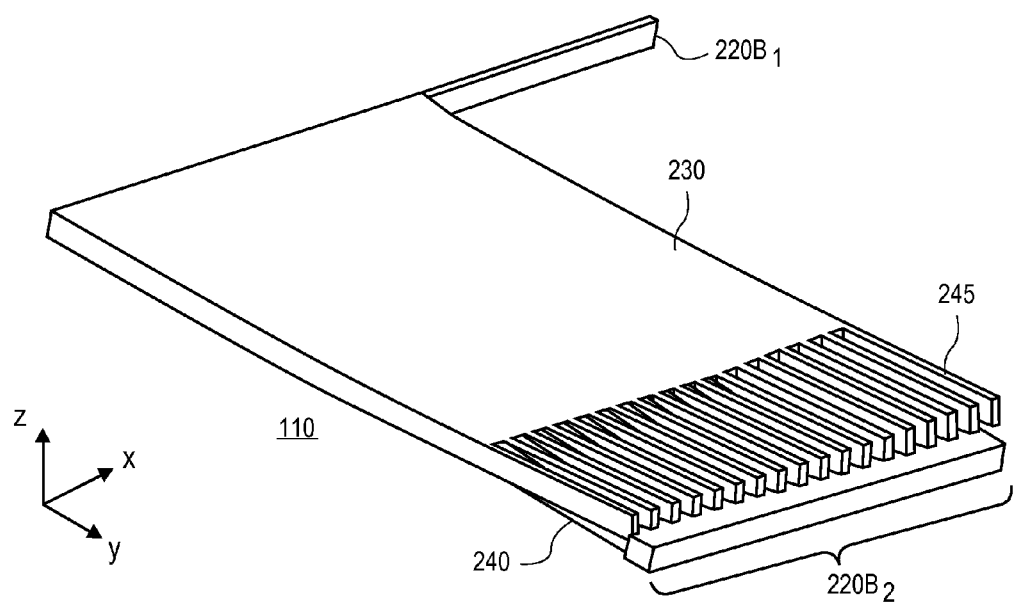
FIG. 2B is an isometric view of a portion of a stress intolerant structure for comparison to the stress tolerant structure in FIG. 2A.

FIG. 2A is an isometric view of a portion of the MEMS structure 101 compared to a similar portion of a stress intolerant structure 201 depicted in FIG. 2B to further illustrate certain physical effects of static deflection matching. In both FIGS. 2A and 2B, deflection is simulated for a 5 MPa/μm stress gradient. Only half of the MEMS structures are depicted because a symmetry boundary condition at the centerline was employed for clarity. Release holes are also not shown on these figures. In FIG. 2A, the dashed line 233 represents the position of the rotor body 130 at a time prior to release from the substrate 110 and the solid line drawing represents the rotor body 130 at a time following release from the substrate 110. As shown, the free end of the rotor body 130 deflects from the plane of the anchor region 120A by an amount $\Delta z$ that is not uniform (e.g., varying from 0.2 μm-1.2 μm). Notably, the stator fingers 140 have deflected in the same direction and by an amount substantially equal to $\Delta z$ and indeed rotor displays nearly identical curvature along both the cantilevered length in the y-dimension and the comb shaft length in the x-dimension. As such, a zero static reading can be achieved subsequent to film release with static overlap capacitance being very near the ideal capacitance associated with these particular geometries. Hence little, if any, calibration and/or trim are needed for proper operation of an accelerometer employing this MEMS architecture. In FIG. 2B however, after the rotor in the stress intolerant MEMS structure 201 is released, the stator remains fully anchored at a point 220B$_2$, more proximate to the rotor fingers 245 than to the rotor anchor 220B$_1$. The stator fingers 240 undergo little, if any, static deflection, resulting in the rotor fingers 245 curling out of plane from the stator for an uncontrolled reduction in static overlap capacitance.

Figure 3A:
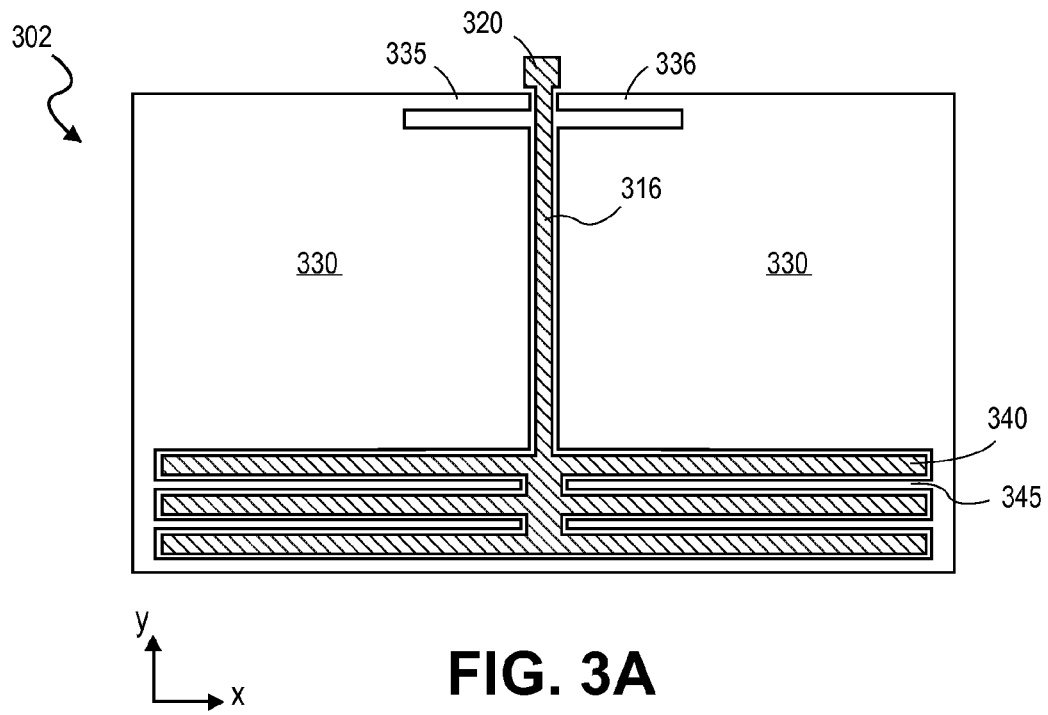
FIGS. 3A-3B are plan views of MEMS structures, in accordance with embodiments of the present invention.
Figure 3B:
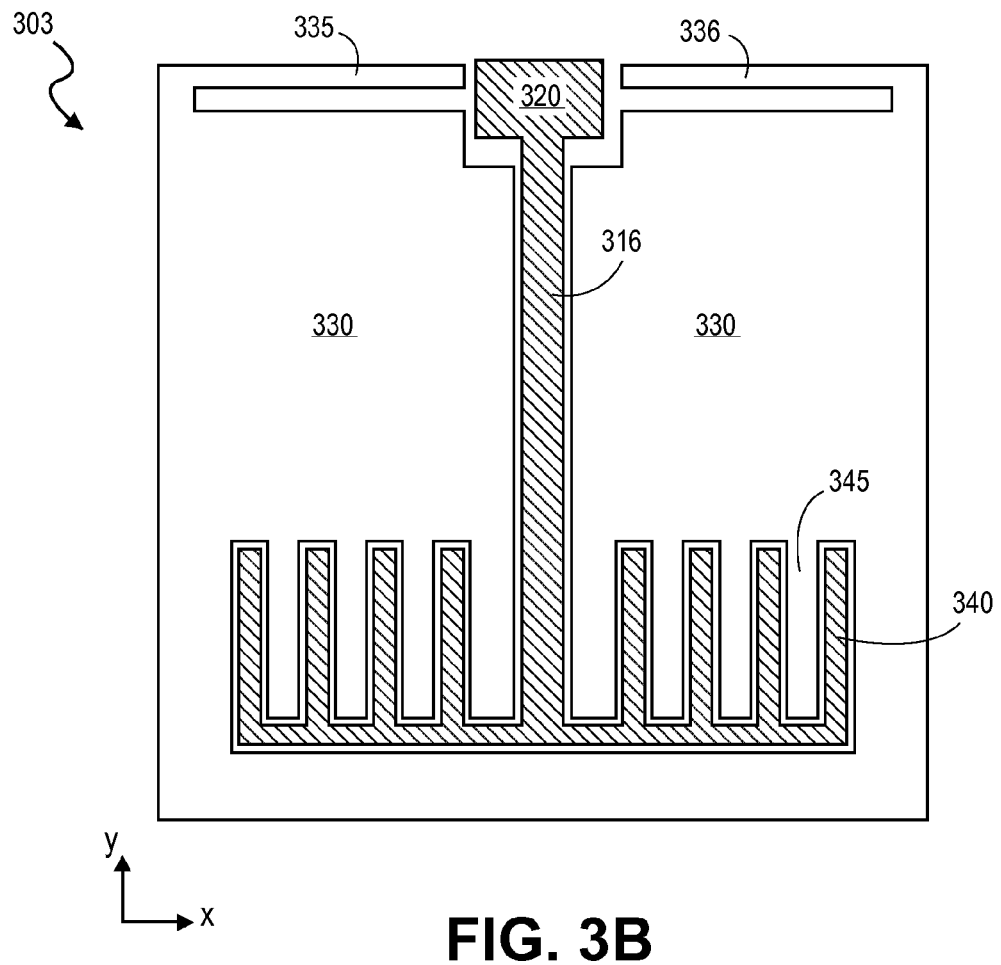

While the exemplary embodiment depicted in FIG. 1A illustrates many advantageous structural features that synergistically improve stress tolerance in the MEMS structure 101, various alternate embodiments are possible. For example, FIGS. 3A-3B are plan views of other stress tolerant MEMS structures, in accordance with other embodiments of the present invention. In the MEMS structure 302, which is also suitable as a z-axis accelerometer, the beam 316 is anchored to a stator anchor point 320 just as in the MEMS structure 101. Furthermore, the rotor body 330 is suspended off torsion springs 335, 336 similar to that in the MEMS structure 101. The stator comb fingers 340 and rotor comb fingers 345 however are oriented orthogonally from the length of the beam 316, rather than in parallel with the beam as in the MEMS structure 101. While the structure 302 is more tolerant of stress than the stress intolerant structure 201 (FIG. 2B), certain aspects of the architecture may be less advantageous than those in the architecture of the MEMS structure 101. For example, the relatively longer comb fingers are more susceptible to mechanical failure, relatively greater deflection in the x-dimension in absence of a comb shaft, etc.

FIG. 3B illustrates another embodiment of a stress tolerant MEMS structure 303, which is also suitable for use as a z-axis accelerometer. This embodiment share many of the features previously described in the context of the MEMS structures 101 and 302, with same reference numbers employed for like structures. In the MEMS structure 303 however, the stator comb fingers 340 are oriented is a direction opposite those of the MEMS structure 101. With the comb fingers 340 directed inward toward the bulk of the rotor body 330 and stator anchor point 320, the rotor comb fingers are directed outward from the bulk of the rotor body 330. While the structure 303 is again more tolerant of stress than the stress intolerant structure 201 (FIG. 2B), certain aspects of the architecture may be less advantageous than those in the architecture of the MEMS structure 101. For example, the beam 316 has an effectively longer lever with the greater mass of the stator comb disposed farther from the stator anchor point 320. As such, the stator may be subject to greater deflection in response to a z-axis acceleration, resulting in a smaller change in capacitance between the rotor and stator.

Figure 4:
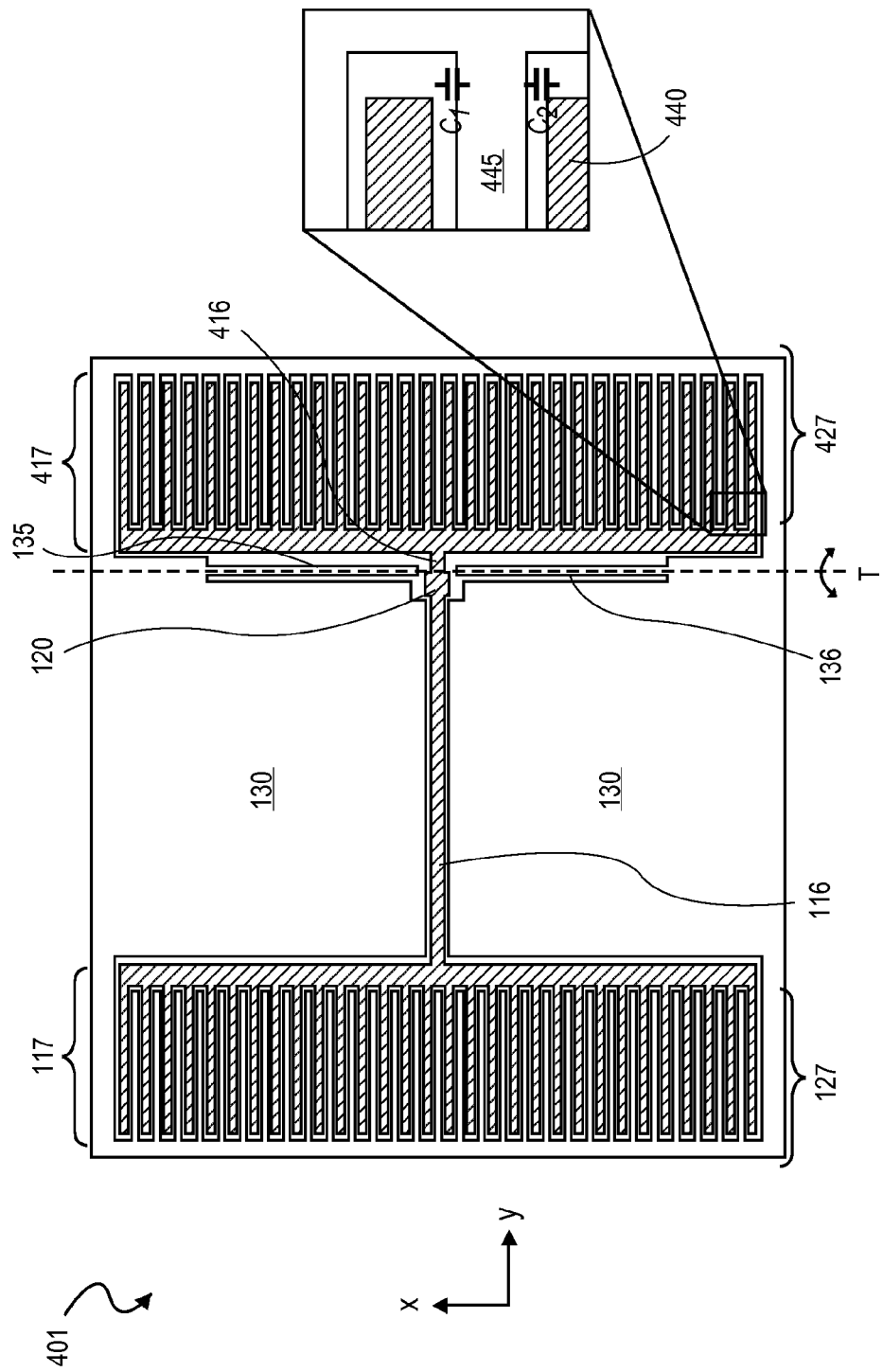
FIG. 4 is a plan view of a MEMS structure including cross-axis compensation members, in accordance with an embodiment of the present invention.

In embodiments, a stress tolerant MEMS structure includes cross-axis compensation members to register a substantially equal and opposite change in capacitance between the rotor and stator in response non-torsional strain in the torsion springs. FIG. 4 is a plan view of a MEMS structure 401 including cross-axis compensation combs 417 and 427, in accordance with an embodiment of the present invention. Generally, the structure 401 includes the elements described in the MEMS structure 101 with the same reference numbers used for like structures. In addition to those elements previously introduced, a second stator comb 417 is cantilevered from beam 416 extending off the stator anchor 120 in a direction opposite the beam 116. The beam 416 is significantly shorter than the beam 416, for example the shaft of the stator comb 410 may be disposed 5-15 µm from the torsion spring axis T. The stator comb 417 includes stator compensation comb fingers 440 extending in a direction parallel to, and opposite of the stator comb fingers 117. The rotor body 130 further includes a second rotor comb 427 enclosing the stator comb with rotor compensation comb fingers 445 parallel to, and in a direction opposite of, the fingers of the stator compensation comb fingers 440. When the MEMS structure 401 is under y-axis acceleration, a change in capacitance registered by the interdigitated comb fingers 117, 127 is negated by an equal and opposite change in capacitance registered by the interdigitated fingers of the compensation combs 417, 427. Changes in capacitance resulting from changes in gap spacing may also be utilized for cross-axis compensation. For example, the expand view of the compensation comb fingers 440, 445 illustrates how a change in capacitance $C_1$ resulting from a displacement of any of the comb structures is negated by an equal and opposite change in capacitance $C_2$.

Figure 5:
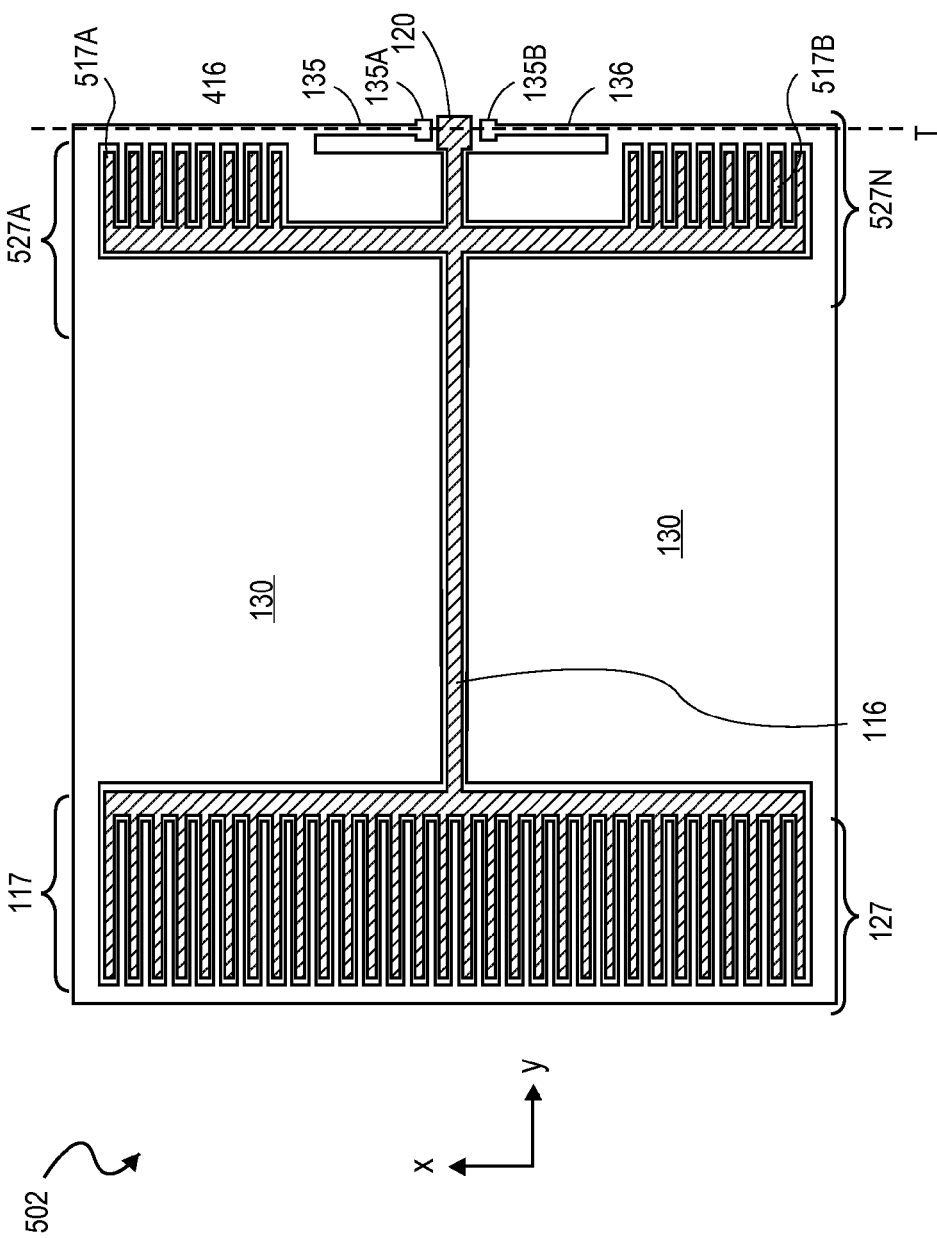
FIG. 5 is a plan view of MEMS structure including cross-axis compensation members, in accordance with an embodiment of the present invention.

FIG. 5 is a plan view of MEMS structure 402 including cross-axis compensation members, in accordance with another embodiment of the present invention. Generally, the MEMS structure 502 illustrates another manner by which the exemplary stress tolerant MEMS structure 101 may be modified with secondary combs for cross-axis compensation. The structure 502 again includes the elements described in the MEMS structure 101 with the same reference numbers used for like structures. In addition to those elements previously introduced, second and third stator combs 517A, 517B are suspended off the cantilevered beam 116, proximate to the rotor torsion springs 135, 136. For y-axis compensation, the stator combs 517A, 517B have fingers that are again parallel to, and extending off the comb shaft in a direction opposite of the fingers in the stator comb 117. Second and third rotor combs 527A, 527B are interdigitated with the second and third stator combs 517A, 517B with the compensation comb fingers parallel to, and in a direction opposite of, the fingers of the stator compensation comb fingers. Total capacitance between 517A, 517B and 527N, 527A is equal to that on the other side (i.e. 117 and 127. While all mass of the rotor is advantageously suspended from one side of the rotor anchor points 135A, 136A, some mass of the rotor body 130 is lost to the rotor combs 527A, 527B. As such, the structure 502 can be expected to respond differently to a z-axis acceleration than does the structure 401.

Figure 6:
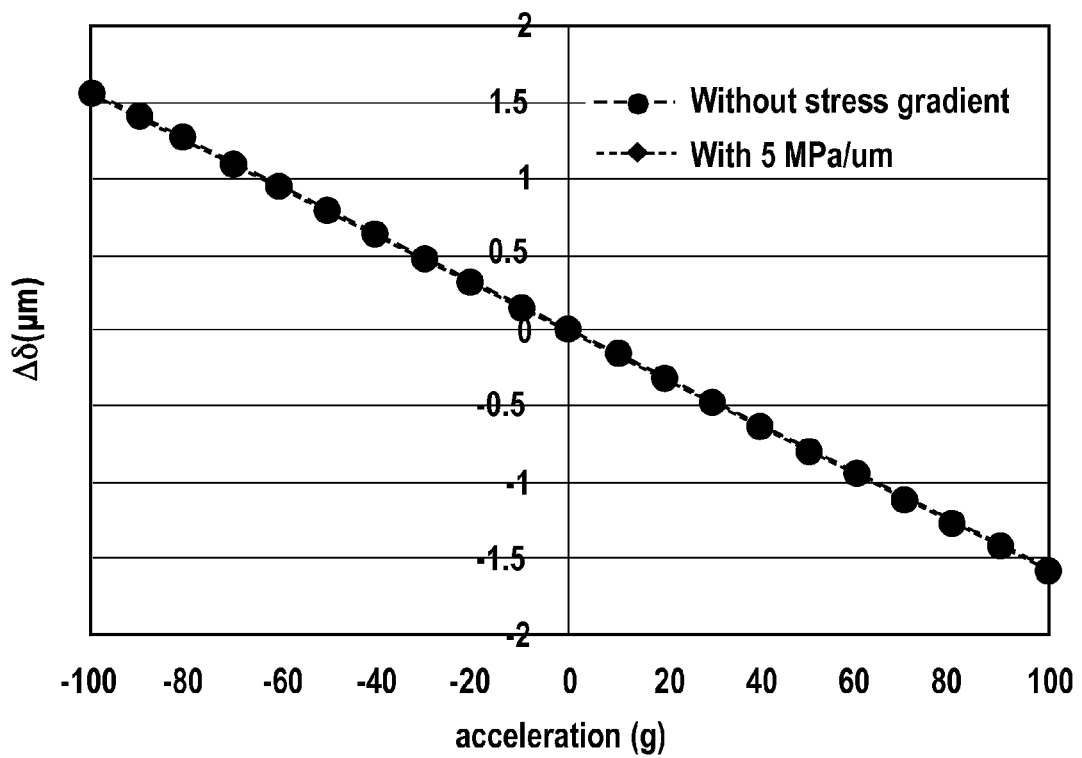
FIG. 6 is a graph showing simulated relative displacement between rotor and stator combs as a function of acceleration for different film stress gradients, in accordance with embodiments of the present invention.

In embodiments, the relative displacement between the rotor and stator associated with the z-axis acceleration is substantially independent of a change in the stress gradient inducing the static deflection. The FIG. 6 is a graph showing simulated relative displacement ($\Delta\delta$) between rotor and stator combs as a function of acceleration for different film stress gradients for the MEMS structure 101, in accordance with embodiments of the present invention. As shown, the curve corresponding to a stress gradient of 5 MPa/µm film thickness overlays the curve corresponding to an ideal case with no stress gradient. Thus, the output response of the MEMS structure 101 to acceleration is independent of an intrinsic film stress gradient.

Figure 7:
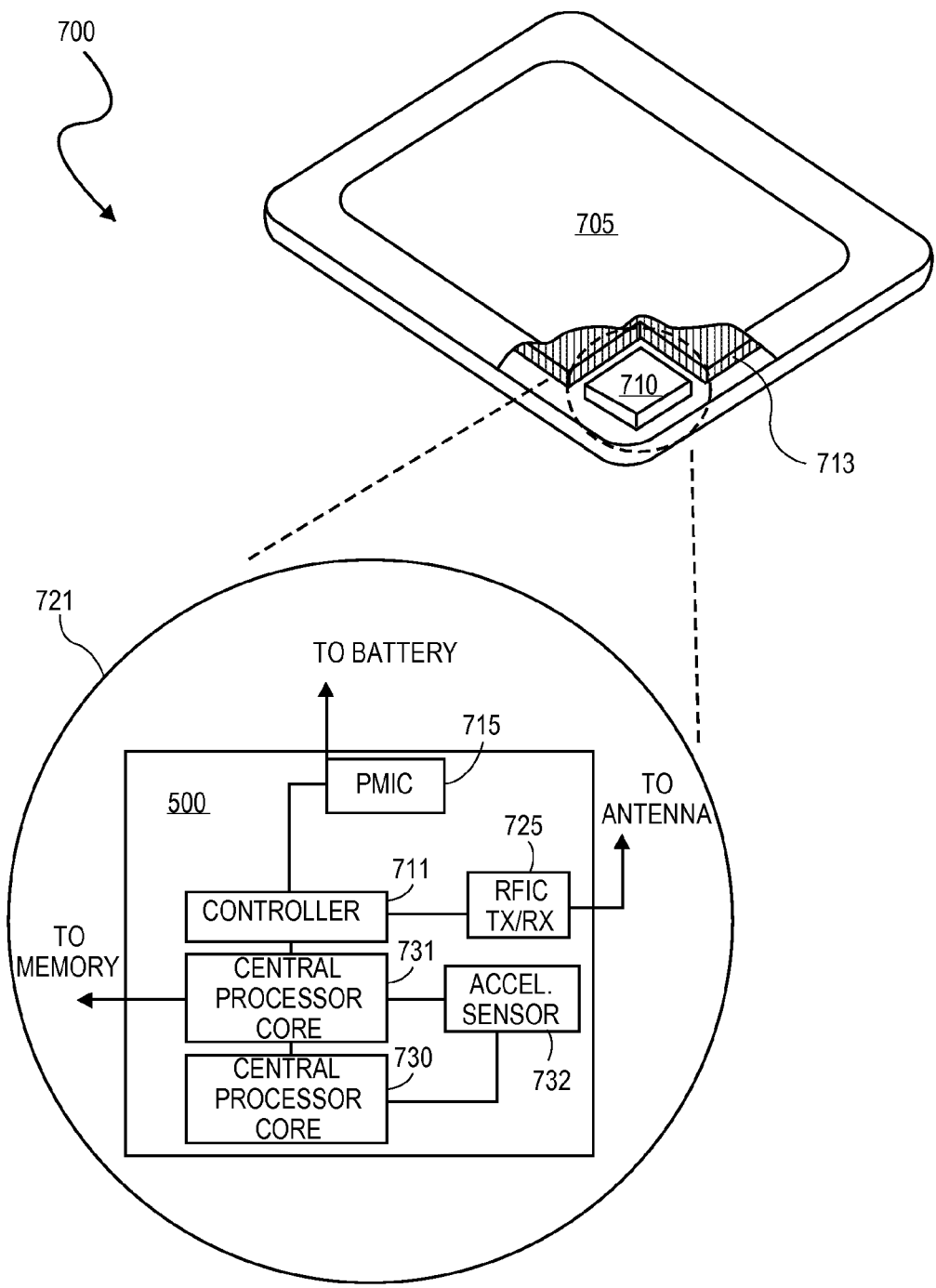
FIG. 7 illustrates isometric and expanded views of a mobile computing platform including a MEMS accelerometer, in accordance with an embodiment.

FIG. 7 illustrates an isometric view of a computing device platform 700 and schematic view 721 of a microelectronic device 710 employed by the platform, in accordance with an embodiment of the present invention. The computing platform 700 may be any portable device configured for each of electronic data display, electronic data processing, and wireless electronic data transmission. For exemplary mobile embodiments, the computing platform 700 may be any of a tablet, a smart phone, laptop or ultrabook computer, etc., and include a display screen 705 that may be a touchscreen (capacitive, inductive, resistive, etc.), a chip-level (SoC) or package-level integrated microelectronic device 710, and a battery 713.

The integrated device 710 is further illustrated in the expanded view 721. In the exemplary embodiment, the device 710 includes at least one memory chip and at least one processor chip (e.g., a multi-core microprocessor and/or graphics processor cores 730, 731). In embodiments, an integrated accelerometer 732 including a stress tolerant MEMS structure, for example as described in more detail elsewhere herein (e.g., FIGS. 1A, 1B, 4, etc.), is integrated into the device 710. The device 710 is further coupled to the board, substrate, or interposer 500 along with, one or more of a power management integrated circuit (PMIC) 715, RF (wireless) integrated circuit (RFIC) 725 including a wideband RF (wireless) transmitter and/or receiver (e.g., including a digital baseband and an analog front end module further comprising a power amplifier on a transmit path and a low noise amplifier on a receive path), and a controller thereof 711. Functionally, the PMIC 715 performs battery power regulation, DC-to-DC conversion, etc., and so has an input coupled to the battery 713 and with an output providing a current supply to all the other functional modules, including the stress tolerant MEMS structure. As further illustrated, in the exemplary embodiment the RFIC 725 has an output coupled to an antenna to provide to implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. In implementations, each of these modules, including the stress tolerant MEMS structure, may be integrated onto a single chip as an SoC, onto separate ICs coupled to a package substrate of the packaged device 710, or at a board level.

Figure 8:
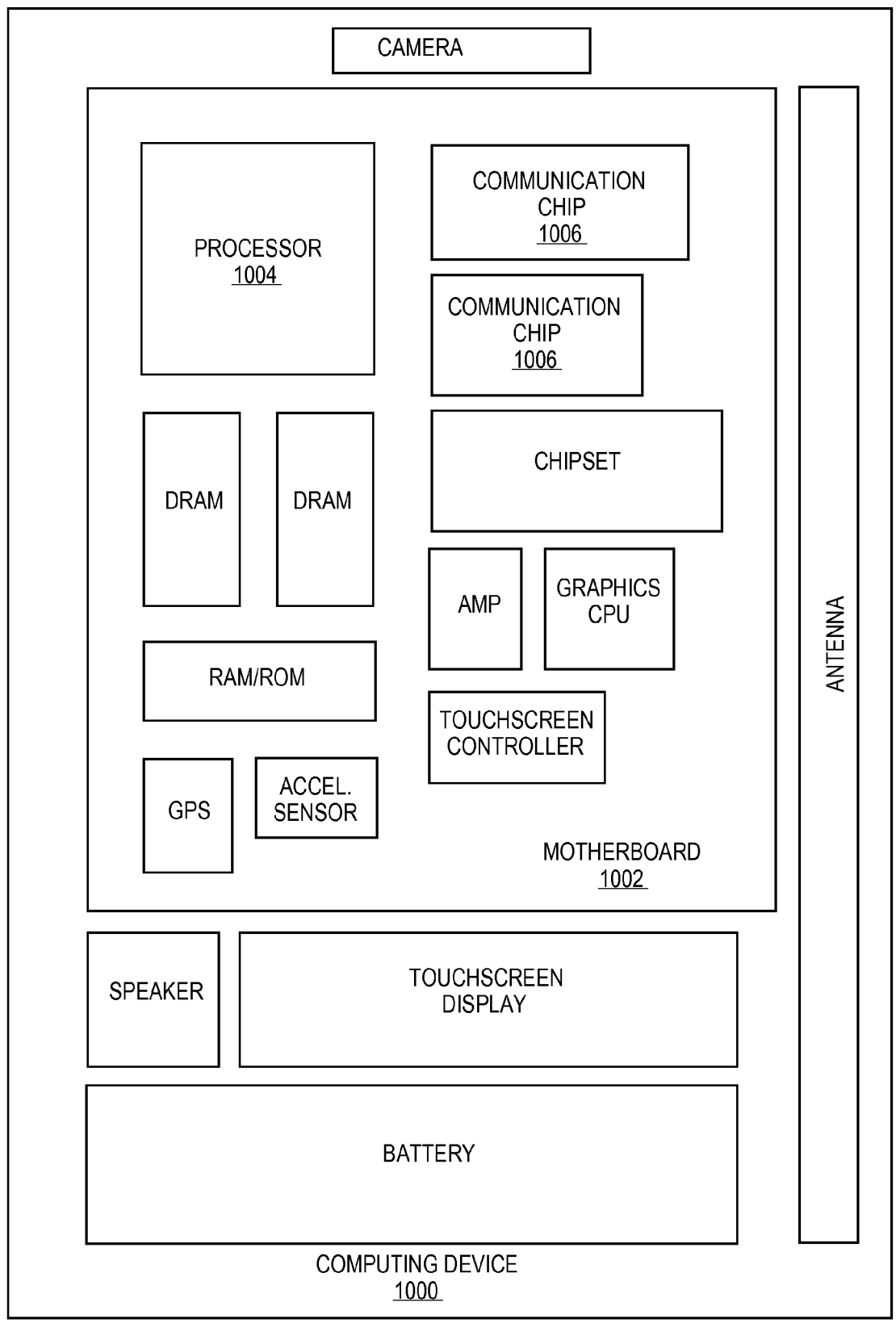
FIG. 8 illustrates a computing device in accordance with one implementation of the invention.

FIG. 8 is a functional block diagram of a computing device 1000 in accordance with one embodiment of the invention. The computing device 1000 may be found inside the platform 700, for example, and further includes a board 1002 hosting a number of components, such as but not limited to a processor 1004 (e.g., an applications processor) and at least one communication chip 1006. In embodiments, at least the processor 1004 is integrated (e.g., in-package) with an inertial sensor in accordance with embodiments described elsewhere herein. The processor 1004 is physically and electrically coupled to the board 1002. The processor 1004 includes an integrated circuit die packaged within the processor where the term "processor" may refer to any device or portion of a device that processes electronic data from registers and/or memory to transform that electronic data into other electronic data that may be stored in registers and/or memory.

In some implementations the at least one communication chip 1006 is also physically and electrically coupled to the board 1002. In further implementations, the communication chip 1006 is part of the processor 1004. Depending on its applications, computing device 1000 may include other components that may or may not be physically and electrically coupled to the board 1002. These other components include, but are not limited to, volatile memory (e.g., DRAM), non-volatile memory (e.g., RAM or ROM) in the form of flash memory or STTM, etc., a graphics processor, a digital signal processor, a crypto processor, a chipset, an antenna, touchscreen display, touchscreen controller, battery, audio codec, video codec, power amplifier, global positioning system (GPS) device, integrated inertial sensor, accelerometer, speaker, camera, and mass storage device (such as hard disk drive, solid state drive (SSD), compact disk (CD), digital versatile disk (DVD), and so forth).

At least one of the communication chips 1006 enables wireless communications for the transfer of data to and from the computing device 1000. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 1006 may implement any of a number of wireless standards or protocols, including but not limited to those described elsewhere herein. The computing device 1000 may include a plurality of communication chips 1006. For instance, a first communication chip 1006 may be dedicated to shorter range wireless communications such as Wi-Fi and Bluetooth and a second communication chip 1006 may be dedicated to longer range wireless communications such as GPS, EDGE, GPRS, CDMA, WiMAX, LTE, Ev-DO, and others.

It is to be understood that the above description is intended to be illustrative, and not restrictive. Exemplary embodiments include a Microelectromechanical System (MEMS), comprising: a substrate; a released stator including: a beam cantilevered from a first anchor point affixed to the substrate; and a plurality of stator comb fingers at an end of the beam opposite the first anchor point. MEMS embodiments further comprise a released rotor including: a body adjacent to opposite sides of the beam and attached to the substrate at a second anchor point that is proximate to, but electrically isolated from, the anchored end of the stator; and a plurality of rotor comb fingers at an end of the body opposite the second anchor point and interdigitated with the stator comb fingers.

In embodiments, the stator beam and the rotor body are of a same conductive thin film layer.

In embodiments, the conductive thin film layer is a metal interconnect layer disposed over semiconductor transistor structures disposed within the substrate.

In embodiments, the stator beam is of a beam length at least ten times greater than a beam width, and the rotor body has a body width more than ten times the beam width.

In embodiments, the stator beam extends through a center of the rotor body width, and the stator and rotor comb fingers are substantially parallel to the length of the beam.

In embodiments, the second anchor point comprises a pair of torsion springs anchored to the substrate on opposite sides of the beam, each torsion spring having a spring length many times a spring width and the spring length extending from their anchors in a direction away from the beam.

In embodiments, the rotor surrounds at least the released end of the stator, wherein the stator comb fingers extend off the beam away from the anchor points, and wherein the rotor comb fingers extend off the body toward the anchor points.

In embodiments, the rotor completely encloses the substrate area occupied by the stator, the stator further comprises second stator comb fingers cantilevered from the first anchor point in a direction opposite that of the beam, and the rotor further comprises second rotor comb fingers interdigitated with the second stator comb fingers.

In embodiments, the second stator comb fingers are substantially parallel to the beam.

Exemplary embodiments further include an integrated accelerometer, comprising one or more of the MEMS embodiments described herein; and at least one of an amplifier or acceleration calculator electrically coupled to the MEMS and comprising integrated circuitry including transistors disposed within the substrate.

In certain such embodiments, the MEMS stator beam and the rotor body are of a same thin film metal interconnect layer disposed over the transistors.

In certain such embodiments, the amplifier is to output a signal based on a change in capacitance sensed between the rotor and the stator, and wherein the acceleration calculator is to determine a z-axis acceleration based on the signal.

Exemplary embodiments further include MEMS z-axis accelerometer, comprising: a substrate including CMOS circuitry; an electrically continuous stator electrically coupled to the CMOS circuitry, formed in a thin film metal interconnect layer over the CMOS circuitry, and including a plurality of first stator fingers cantilevered from the substrate; and an electrically continuous rotor electrically coupled to the CMOS circuitry, formed in the thin film metal interconnect layer, and anchored by two torsion springs, the rotor having a mass greater than that of the stator and including a plurality of first rotor fingers extending parallel to ones of the first stator fingers to register a change in capacitance between the rotor and stator in response to torsion in the torsion springs displacing the rotor relative to the stator, wherein the first rotor and stator fingers are approximately a same distance away, and with a same static deflection in the z-axis, from their respective anchor points.

In embodiments, the CMOS circuitry is to determine a z-axis acceleration based on the change in capacitance.

In embodiments, a relative displacement between the rotor and stator associated with the z-axis acceleration is substantially independent of a change in the stress gradient inducing the static deflection.

In embodiments, the stator and rotor further comprise second fingers to register a substantially equal and opposite change in capacitance between the rotor and stator in response non-torsional strain in the torsion springs.

In embodiments, the first stator fingers are disposed at an end of the stator opposite the stator anchor point and wherein the first torsion springs are affixed at rotor anchor points disposed on opposite sides of the stator anchor point.

In embodiments, the first stator fingers extend from a beam cantilevered from the stator anchor point, the beam aligned with a center of the rotor Exemplary embodiments further include a mobile computing platform comprising: a MEMS accelerometer; a display screen to display output dependent on an acceleration registered by accelerometer; and a wireless transceiver relay information dependent on an acceleration registered by accelerometer.

In embodiments, the MEMS accelerometer further comprises: a substrate including CMOS circuitry; an electrically continuous stator electrically coupled to the CMOS circuitry, formed in a thin film metal interconnect layer over the CMOS circuitry, and with a plurality of first stator fingers cantilevered from the substrate.

In embodiments, the MEMS accelerometer further comprises: an electrically continuous rotor electrically coupled to the CMOS circuitry, formed in the thin film metal interconnect layer, and anchored by two torsion springs, the rotor having a mass greater than that of the stator and including a plurality of first rotor fingers extending parallel to ones of the first stator fingers to register a change in capacitance between the rotor and stator in response to torsion in the torsion springs.

In embodiments, the first rotor and stator fingers are approximately a same distance away, and with a same static deflection in the z-axis, from their respective anchor points. In embodiments, the acceleration is a z-axis acceleration determined by the CMOS circuitry based on the change in capacitance, and wherein a relative displacement between the rotor and stator associated with the z-axis acceleration is substantially independent of a change in a film stress gradient inducing the static deflection.

Many other embodiments will be apparent to those of skill in the art upon reading and understanding the above description. Flow diagrams in the figures show a particular order of operations performed by certain embodiments of the invention, however such order is not necessarily required (e.g., alternative embodiments may perform the operations in a different order, combine certain operations, overlap certain operations, etc.). Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. A Microelectromechanical System (MEMS), comprising:
    a substrate;
    a released stator including:
        a beam cantilevered from a first anchor point affixed to the substrate forming an anchored end of the stator; and
        a plurality of stator comb fingers at an end of the beam opposite the first anchor point; and
    a released rotor including:
        a body adjacent to opposite sides of the beam and attached to the substrate at a second anchor point that is proximate to, but electrically isolated from, the anchored end of the stator, wherein all anchor points of the stator and rotor residue at one end of the MEMS; and
        a plurality of rotor comb fingers at an end of the body opposite the second anchor point and interdigitated with the stator comb fingers.

2. The MEMS of claim 1, wherein the stator beam and the rotor body are of a same conductive thin film layer.

3. The MEMS of claim 2, wherein the conductive thin film layer is a metal interconnect layer disposed over semiconductor transistor structures disposed within the substrate.

4. The MEMS of claim 1, wherein the beam is of a beam length at least ten times greater than a beam width, and wherein the body has a body width more than ten times the beam width.

5. The MEMS of claim 1, wherein the beam extends through a center of a width of the rotor body, and wherein the stator and rotor comb fingers are substantially parallel to a length of the beam.

6. The MEMS of claim 5, wherein the second anchor point comprises a pair of torsion springs anchored to the substrate on opposite sides of the beam by respective anchors, each torsion spring having a spring length many times a spring width and the spring length extending from their anchors in a direction away from the beam.

7. The MEMS of claim 1, wherein the rotor surrounds at least the released end of the stator, wherein the stator comb fingers extend off the beam away from the anchor points, and wherein the rotor comb fingers extend off the body toward the anchor points.

8. The MEMS of claim 1, wherein the rotor completely encloses a substrate area occupied by the stator, wherein the stator further comprises additional stator comb fingers cantilevered from the first anchor point in a direction opposite that of the beam, and wherein the rotor further comprises additional rotor comb fingers interdigitated with the second stator comb fingers.

9. The MEMS of claim 8, wherein the additional stator comb fingers are substantially parallel to the beam.

10. An integrated accelerometer, comprising:
    the MEMS of claim 1; and
    at least one of an amplifier or an acceleration calculator electrically coupled to the MEMS and comprising integrated circuitry including transistors disposed within the substrate.

11. The integrated accelerometer of claim 10, wherein the stator beam and the rotor body are of a same thin film metal interconnect layer disposed over the transistors.

12. The integrated accelerometer of claim 10, wherein the amplifier is to output a signal based on a change in capacitance sensed between the rotor and the stator, and wherein the acceleration calculator is to determine a z-axis acceleration based on the signal.

13. A Microelectromechanical System (MEMS) z-axis accelerometer, comprising:
    a substrate including CMOS circuitry;
    an electrically continuous stator electrically coupled to the CMOS circuitry, formed in a thin film metal interconnect layer over the CMOS circuitry, and including a plurality of first stator fingers cantilevered from the substrate; and
    an electrically continuous rotor electrically coupled to the CMOS circuitry, formed in the thin film metal interconnect layer, and anchored by two torsion springs, the rotor having a mass greater than that of the stator and including a plurality of first rotor fingers extending parallel to ones of the first stator fingers to register a change in capacitance between the rotor and stator in response to torsion in the torsion springs displacing the rotor relative to the stator, wherein the first rotor and stator fingers are approximately a same distance away, and with a same static deflection in a z-axis, from respective anchor points of the rotor and stator, wherein, all anchor points of the stator and rotor reside at one end of the MEMS accelerometer.

14. The MEMS accelerometer of claim 13, wherein the CMOS circuitry is to determine a z-axis acceleration based on the change in capacitance.

15. The MEMS accelerometer of claim 14, wherein a relative displacement between the rotor and stator associated with the z-axis acceleration is substantially independent of a change in a stress gradient inducing the static deflection.

16. The MEMS accelerometer of claim 13, wherein the stator and rotor further comprise second fingers to register a substantially equal and opposite change in capacitance between the rotor and stator in response non-torsional strain in the torsion springs.

17. The MEMS accelerometer of claim 13, wherein the first stator fingers are disposed at an end of the stator opposite the stator anchor point and wherein the first torsion springs are affixed at rotor anchor points disposed on opposite sides of the stator anchor point.

18. The MEMS accelerometer of claim 17, wherein the first stator fingers extend from a beam cantilevered from the stator anchor point, the beam aligned with a center of the rotor.

19. A mobile computing platform comprising:
a MEMS accelerometer;
a display screen to display output dependent on an acceleration registered by the MEMS accelerometer; and
a wireless transceiver to relay information dependent on another acceleration registered by the MEMS accelerometer, wherein the MEMS accelerometer further comprises:
a substrate including CMOS circuitry;
an electrically continuous stator electrically coupled to the CMOS circuitry, formed in a thin film metal interconnect layer over the CMOS circuitry, and including a plurality of stator fingers cantilevered from the substrate; and
an electrically continuous rotor electrically coupled to the CMOS circuitry, formed in the thin film metal interconnect layer, and anchored by two torsion springs, the rotor having a mass greater than that of the stator and including a plurality of rotor fingers extending parallel to ones of the stator fingers to register a change in capacitance between the rotor and stator in response to torsion in the torsion springs, wherein the rotor and stator fingers are approximately a same distance away, and with a same static deflection in the z-axis, from respective anchor points of the rotor and stator, the respective anchor points of the rotor and stator being proximately located to one another, wherein, all anchor points of the stator and rotor reside at one end of the MEMS accelerometer.

20. The mobile computing platform of claim 19, wherein the acceleration is a z-axis acceleration determined by the CMOS circuitry based on the change in capacitance, and wherein a relative displacement between the rotor and stator associated with the z-axis acceleration is substantially independent of a change in a film stress gradient inducing the static deflection.

21. The mobile computing platform of claim 19, wherein the stator includes a cantilevered beam having a beam length at least ten times greater than a beam width, wherein the rotor has a body width more than ten times the beam width, wherein the beam extends through a center of the rotor body width, and wherein the stator and rotor fingers are substantially parallel to the length of the beam.

* * * * *